(12) United States Patent
Riani et al.

(10) Patent No.: US 9,258,155 B1
(45) Date of Patent: Feb. 9, 2016

(54) PAM DATA COMMUNICATION WITH REFLECTION CANCELLATION

(71) Applicant: INPHI CORPORATION, Santa Clara, CA (US)

(72) Inventors: Jamal Riani, Fremont, CA (US); Sudeep Bhoja, San Jose, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 14/597,120

(22) Filed: Jan. 14, 2015

(51) Int. Cl.
*H04L 25/03* (2006.01)

(52) U.S. Cl.
CPC .............................. *H04L 25/03885* (2013.01)

(58) Field of Classification Search
CPC . H04L 25/03885; H04L 1/0057; H04L 27/00; H04L 2025/0349; H04L 25/03057; H04L 12/2805; H04L 12/2816; H04L 1/0041; H04L 1/0045; H04L 2012/2849; H04L 2025/03363; H04L 25/03949; H04L 27/2613; H04L 27/2626; H04L 5/0048; H04L 27/262; H04L 27/2662; H04L 1/0054; H04L 25/0232; H04L 27/02; H04L 27/2621; H04L 27/3863; H04L 5/0023; H04L 1/1812
See application file for complete search history.

(56) References Cited

U.S. PATENT DOCUMENTS

| | | | |
|---|---|---|---|
| 5,592,612 A | 1/1997 | Birk | |
| 6,128,094 A | 10/2000 | Smith | |
| 6,400,621 B2 | 6/2002 | Hidaka et al. | |
| 6,542,956 B1 | 4/2003 | Lee et al. | |
| 6,993,701 B2 | 1/2006 | Corbett et al. | |
| 7,656,727 B2 | 2/2010 | Thayer | |
| 7,990,746 B2 | 8/2011 | Rajan | |
| 8,325,554 B2 | 12/2012 | Sweere et al. | |
| 8,687,451 B2 | 4/2014 | Wang | |
| 9,077,574 B1* | 7/2015 | Healey | H04L 25/03057 |
| 2004/0123029 A1 | 6/2004 | Dalal et al. | |
| 2006/0200697 A1 | 9/2006 | Ito | |
| 2006/0251194 A1* | 11/2006 | Bublil et al. | 375/348 |
| 2008/0104290 A1 | 5/2008 | Cowell et al. | |
| 2008/0183959 A1 | 7/2008 | Pelley et al. | |
| 2009/0141558 A1 | 6/2009 | Sarin et al. | |
| 2009/0300259 A1 | 12/2009 | Luo et al. | |
| 2010/0005212 A1 | 1/2010 | Gower et al. | |
| 2010/0162037 A1 | 6/2010 | Maule et al. | |
| 2010/0199125 A1 | 8/2010 | Reche | |
| 2010/0274952 A1 | 10/2010 | Lee | |
| 2011/0072200 A1 | 3/2011 | Lee et al. | |
| 2011/0103459 A1* | 5/2011 | Esmailian | H04L 25/03006 375/233 |

(Continued)

OTHER PUBLICATIONS

Office Action for U.S. Appl. No. 13/653,373, dated Mar. 27, 2014.

(Continued)

*Primary Examiner* — Hirdepal Singh
(74) *Attorney, Agent, or Firm* — Richard T. Ogawa; Ogawa P.C.

(57) ABSTRACT

The present invention is directed to data communication systems and methods. More specifically, embodiments of the present invention provide a communication system that removes reflection signals. A digital data stream is processed through both tentative path and the main path. The tentative path uses a first DFE device and a reflection cancellation circuit to generate a correction signal for removing reflection signal from the digital data stream. A second DFE device removes ISI and other noises from the corrected digital data stream. There are other embodiments as well.

19 Claims, 5 Drawing Sheets

(56) References Cited

U.S. PATENT DOCUMENTS

| | | |
|---|---|---|
| 2011/0125990 A1 | 5/2011 | Khosravi et al. |
| 2011/0142120 A1* | 6/2011 | Liu et al. .................. 375/233 |
| 2011/0170329 A1 | 7/2011 | Kang |
| 2012/0151294 A1 | 6/2012 | Yoo et al. |
| 2012/0243299 A1 | 9/2012 | Shau |
| 2012/0257459 A1 | 10/2012 | Berke |
| 2012/0297231 A1 | 11/2012 | Qawami et al. |
| 2013/0060996 A1 | 3/2013 | Berke |
| 2013/0202065 A1* | 8/2013 | Chmelar .................. 375/340 |
| 2013/0230093 A1* | 9/2013 | Aziz et al. ................ 375/233 |
| 2013/0243066 A1* | 9/2013 | Palusa et al. ............. 375/232 |
| 2014/0064352 A1* | 3/2014 | Zhong ...................... 375/233 |
| 2014/0146867 A1* | 5/2014 | Shvydun et al. .......... 375/233 |
| 2015/0030062 A1* | 1/2015 | Kossel et al. ............. 375/232 |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.

* cited by examiner

PAM DATA COMMUNICATION WITH REFLECTION CANCELLATION

CROSS-REFERENCES TO RELATED APPLICATIONS

This patent application is related to U.S. patent application Ser. No. 13/791,201, filed 8 Mar. 2013, titled "OPTICAL COMMUNICATION INTERFACE UTILIZING CODED PULSE AMPLITUDE MODULATION", which claims priority from U.S. Provisional Patent Application No. 61/714,543, filed 16 Oct. 2012, titled "100G PA CODED MODULATION", and U.S. Provisional Patent Application No. 61/699,724, titled "ADAPTIVE ECC FOR FLASH MEMORY", all of which are incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to data communication systems and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication systems and methods. More specifically, embodiments of the present invention provide a communication system that removes reflection signals. A digital data stream is processed through both tentative path and the main path. The tentative path uses a first DFE device and a reflection cancellation circuit to generate a correction signal for removing reflection signal from the digital data stream. A second DFE device removes ISI and other noises from the corrected digital data stream. There are other embodiments as well.

According to an embodiment, the present invention provides a communication system. The system includes an input receiver device for receiving an analog data stream. The system also includes an analog to digital converter (ADC) device coupled to the input receiver device. The ADC device is configured to convert the analog data stream to a digital data stream. The digital data stream comprises a first signal and a first noise profile associated with the first signal. The first noise profile includes inter-symbol interference (ISI) noise signals and reflection signals. The system also includes a feed forward equalizer (FFE) device coupled to the ADC device and configured to a tentative signal path and a main signal path. The system additionally includes a first decision feedback equalizer (DFE) device configured to an output of the feed forward equalizer device through the tentative signal path. The first DFE is configured to remove at least a first portion of the ISI noise signals. The system additionally includes an adder device configured to connect the tentative signal path and the main signal path. The system further includes a reflection canceller circuit coupled to the first DFE device and configured to the main signal path through the adder device. The reflection canceller circuit is configured to input a plurality of correction signals. The correction signals are configured to cancel a second portion of the ISI noise signal and reflection signal signals traversing through the main signal path. The system also includes an output of an adder device in the adder device configured to output an intermediary signal. The system additionally includes a second DFE device configured to the main signal path and configured to output a PAM 4 symbol in digital form. The resulting PAM 4 symbol is based on at least the intermediary signal and the digital data stream.

According to another embodiment, the present invention provides a communication system that includes an input receiver device for receiving an analog data stream. The system also includes an analog to digital converter (ADC) device coupled to the input receiver device. The ADC device is configured to convert the analog data stream to a digital data stream. The digital data stream comprises a first signal and a first noise profile associated with the first signal. The first noise profile includes inter-symbol interference (ISI) noise signals and reflection signals. The system further includes a feed forward equalizer (FFE) device coupled to the ADC device and configured to a tentative signal path and a main signal path. The system additionally includes a first decision feedback equalizer (DFE) device configured to an output of the feed forward equalizer device through the tentative signal path. The first DFE is configured to remove at least a first portion of the ISI noise signals. The system further includes an adder device configured to connect the tentative signal path and the main signal path. The system also includes a reflection canceller circuit coupled to the first DFE device and configured to the main signal path through the adder device. The reflection canceller circuit is configured to input a plurality of correction signals. The correction signal is configured to cancel a second portion of the ISI noise signal and reflection signals traversing through the main signal path. The system further includes an output of an adder device in the adder device configured to output an intermediary signal. The system also includes a second DFE device configured to the main signal path and configured to output a PAM 4 symbol in digital form. The resulting PAM 4 symbol is based on at least the intermediary signal and the digital data stream. The system also includes a forward error correcting decoder device.

According to yet another embodiment, the present invention provides a communication system that includes an input receiver device for receiving an analog data stream. The system includes an analog to digital converter (ADC) device coupled to the input receiver device. The ADC device is configured to convert the analog data stream to a digital data stream. The digital data stream comprises a first signal and a first noise profile associated with the first signal. The first noise profile includes inter-symbol interference (ISI) noise signals and reflection signals. The system additionally includes a feed forward equalizer (FFE) device coupled to the ADC device and configured to a tentative signal path and a main signal path. The system further includes a slicer device configured to an output of the feed forward equalizer device through the tentative signal path. The slicer device is configured to remove at least a first portion of the ISI noise signals. The system further includes an adder device configured to connect the tentative signal path and the main signal path. The system additionally includes a reflection canceller circuit coupled to the slicer device and configured to the main signal path through the adder device. The reflection canceller circuit is configured to input a plurality of correction signals. The correction signals are configured to cancel a second portion of the ISI noise signal and the reflection signals traversing through the main signal path. The system further includes an output of an adder device in the adder device configured to output an intermediary signal. The system additionally includes a DFE device configured to the main signal path and configured to output a PAM 4 symbol in digital form. The resulting PAM 4 symbol is based on at least the intermediary signal and the digital data stream.

It is to be appreciated that embodiments of the present invention provides many advantages over existing solutions. Conventional DFEs usually use feed-forward (open-loop) equalization for the first few (and most important) taps, which often causes performance loss. In addition, at some implementations/speeds, the loop can be closed with extensive speculation, many are iteration-bound and unable to close the first few taps. Conventional DFEs are difficult to utilize in PAM-4 (or higher order PAM) based communication systems. For example, conventional PAM-4 DFEs implemented in parallel suffer a 4N exponential state increase, and conventional successive approximation PAM-4 DFEs typically have an increased amount of analog content to carry more approximations forward. In comparison, embodiments of the present invention provide reflection signal cancellation that is used in conjunction with DFEs, which offer both the performance and ease of implementation. In addition, embodiments of the present invention can be used with existing communication systems. There are other embodiments as well.

DETAILED DESCRIPTION OF THE INVENTION

Figure 1:
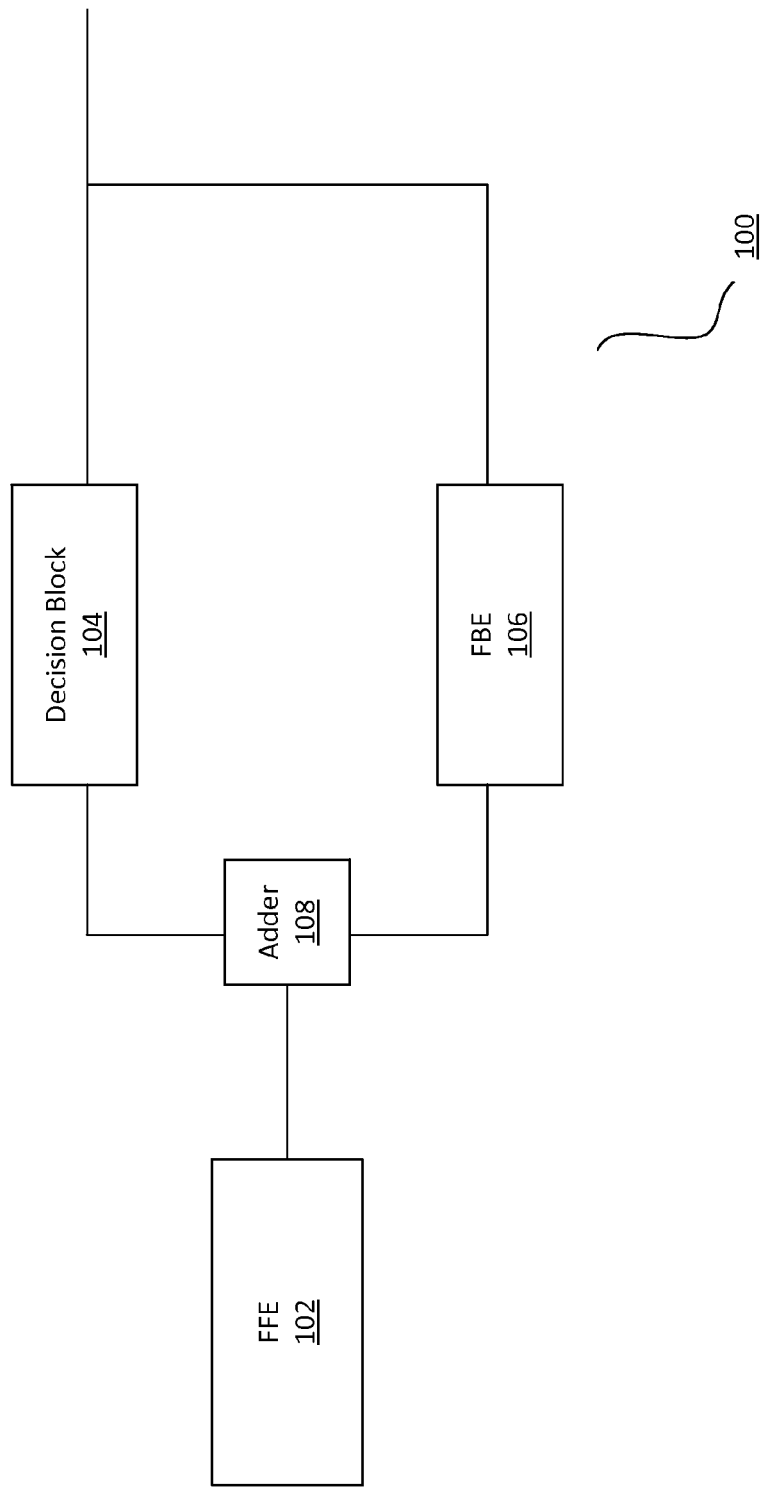
FIG. 1 is a simplified diagram illustrating a conventional DFE 100. The FFE 102 processes input data received from a communication channel.

The present invention is directed to data communication systems and methods. More specifically, embodiments of the present invention provide a communication system with a tentative path and a main path. A digital data stream is processed through both tentative path and the main path. The tentative path uses a first device and a reflection cancellation circuit to generate a correction signal for removing reflection signal from the digital data stream. A second DFE device removes ISI and other noises from the corrected digital data stream. There are other embodiments as well.

As explained above, high speed communication systems and methods are important, and improvements of which are desirable. For example, variants of pulse amplitude modulation (PAM) have been used for high-speed data communication, where a large amount of data is processed through high-speed data communication network. For example, using multiple data communication channels, PAM based communication systems can provide high-transmission speed (up to and over 100 gigabits/s). Using PAM, the message information is encoded in the amplitude of a series of signal pulses. It is an analog pulse modulation scheme in which the amplitudes of a train of carrier pulses are varied according to the sample value of the message signal. Demodulation is performed by detecting the amplitude level of the carrier at every symbol period. For example, PAM4, PAM6, PAM8, and other variants of PAMs can be used in data communication.

An important aspect of data communication is error correction. High-speed communication is meaningless if the data are corrupted or lost during the data communication process. Depending on the communication link and encoding mechanism, various types of error correction mechanisms can be used. In PAM communication, data are modulated into symbols and transmitted from a transmitting entity to a receiving entity. The receiving entity extracts data from the received symbols.

Between the transmitting entity and the receiving entity, through which the symbols are transmitted, there is a medium or a channel. For example, a channel refers to a medium that carries the symbols from the transmitting entity to the receiving entity. For example, a channel can be serviced by a wired, wireless, optical, or another media, depending upon the communication system type. Regardless the type of channel used, symbols are distorted when transmitted through the channel. More specifically, when transmitted through a communication channels a subject symbol may have interference with symbols surrounding the subject symbol. For example, this type of distortion is referred to as "inter-symbol-interference" (ISI).

Over the past, various solutions have been proposed. For example, equalizers are used to remove channel effects, including ISI, from a received symbol. In a conventional equalizer, a communication channel is first estimated, typically using a training sequence. A set of equalizer coefficient is then generated based on the channel estimate. The equalizer uses the coefficients when extracting data from the symbols. Depending on the implementation, the coefficients can also be used after data extraction. Effectively, the coefficients characterize channel characteristics for optimal data extraction from the symbols, and they are updated as needed.

Accuracy of data communication depends on the equalizer performance. As rate of data communication increases (moving up to 100 gigabits/s and more), the importance of equalizers and challenge of implementation thereof grew. For example, in certain high-speed data communication applications, a large number (e.g., 30 or more) feed-forward equalizers (FFE) are need to implement a decision feedback equalizer (DFE).

FIG. 1 is a simplified diagram illustrating a conventional DFE 100. The FFE 102 processes input data received from a communication channel. In addition to the actual data that are to be processed, the FFE 102 also receives noise that is bundled with the data. For example, the noises that are bundled with the data can be attributed to communication link, interference, ISI, and other sources. As shown in FIG. 1, the decision block 104 generates an output that is based on both the FFE 102 and the feedback equalizer (FBE) 106. The FBE 106, similar to FFE 102, has its own set of coefficients. By using the outputs of both FFE 102 and the FBE 106, the decision block 104 is effectively using both current input and past decisions to generate a corrected output value, and the coefficients assign the weight assigned to current input and past decisions.

An important aspect of the DEF 100 is thus to compute the coefficients for the FFE 102 and the FBE 106. Objectives in determining the coefficients are to minimize noises and errors. For example, there have been various methods in computing the coefficients in the past, such as Cholesky decomposition method, and others.

Unfortunately, conventional techniques have been inadequate. For example, in addition to ISI, there are also various types of disturbances, such as reflection signals and ISI. For example, reflection signals can be attributed to impedance mismatch where a signal carrying data is not damped out, but instead leaves reflection signal. It is to be appreciated that embodiments of the present invention efficiently remove reflection signal, as described below.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

As mentioned above, embodiments of the present invention remove reflection signal. For example, embodiments of the present invention are used in PAM-4 communication, and reflection cancellation is implemented in conjunction with DFEs and/or slicers, which remove other types of noises as well.

Figure 2:
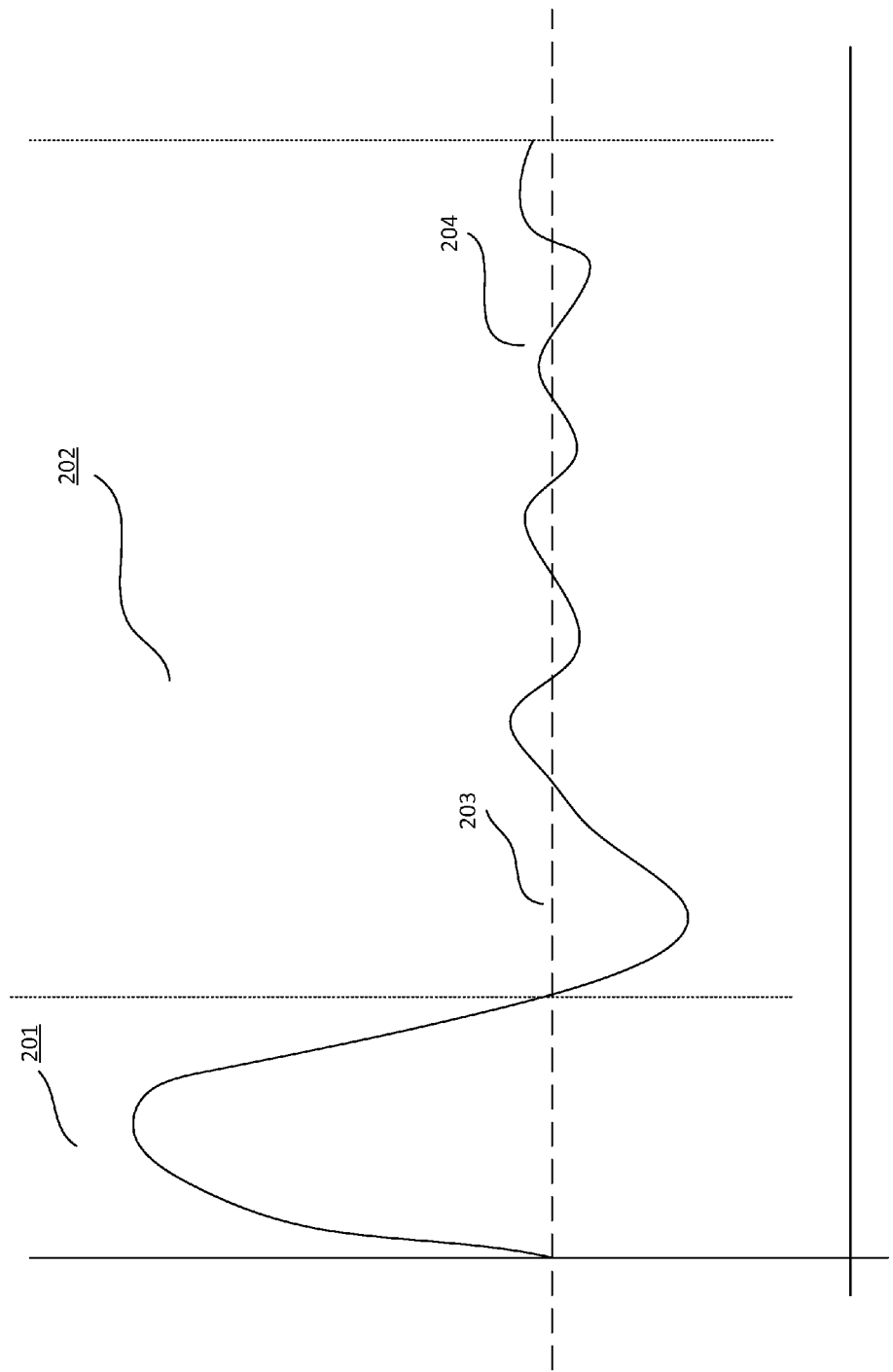
FIG. 2 is a simplified diagram illustrating a reflection signal profile.

FIG. 2 is a simplified diagram illustrating a reflection signal profile. As shown in FIG. 2, a wave form carries a signal at the region 201. The reflection signal is shown at the region 202. Since the reflection signals often cascades and oscillates over a relative extended period of time, removing reflection signals can be a computationally expensive process. In addition, multiple FFEs are often needed for the first few taps, which may result in performance loss. To remove or cancel reflection using FFEs, a large number of FFEs are needed. For example, 30 or more FFEs may be required to remove reflection signals. As an example, reflection signals refer to undesirable signals that are often undesirable results of ISI. Depending on the device implementation and the actual usage, the amount of power required by the large number of FFEs can be large and impractical.

It is thus to be appreciated that embodiments of the present invention remove reflection signals efficiently, and with relatively ease of implementation in terms of both hardware and methods thereof. For example, by using specific reflection cancellation unit, the need for multiple FFEs is eliminated, and a relatively smaller device size can be achieved.

Figure 3:
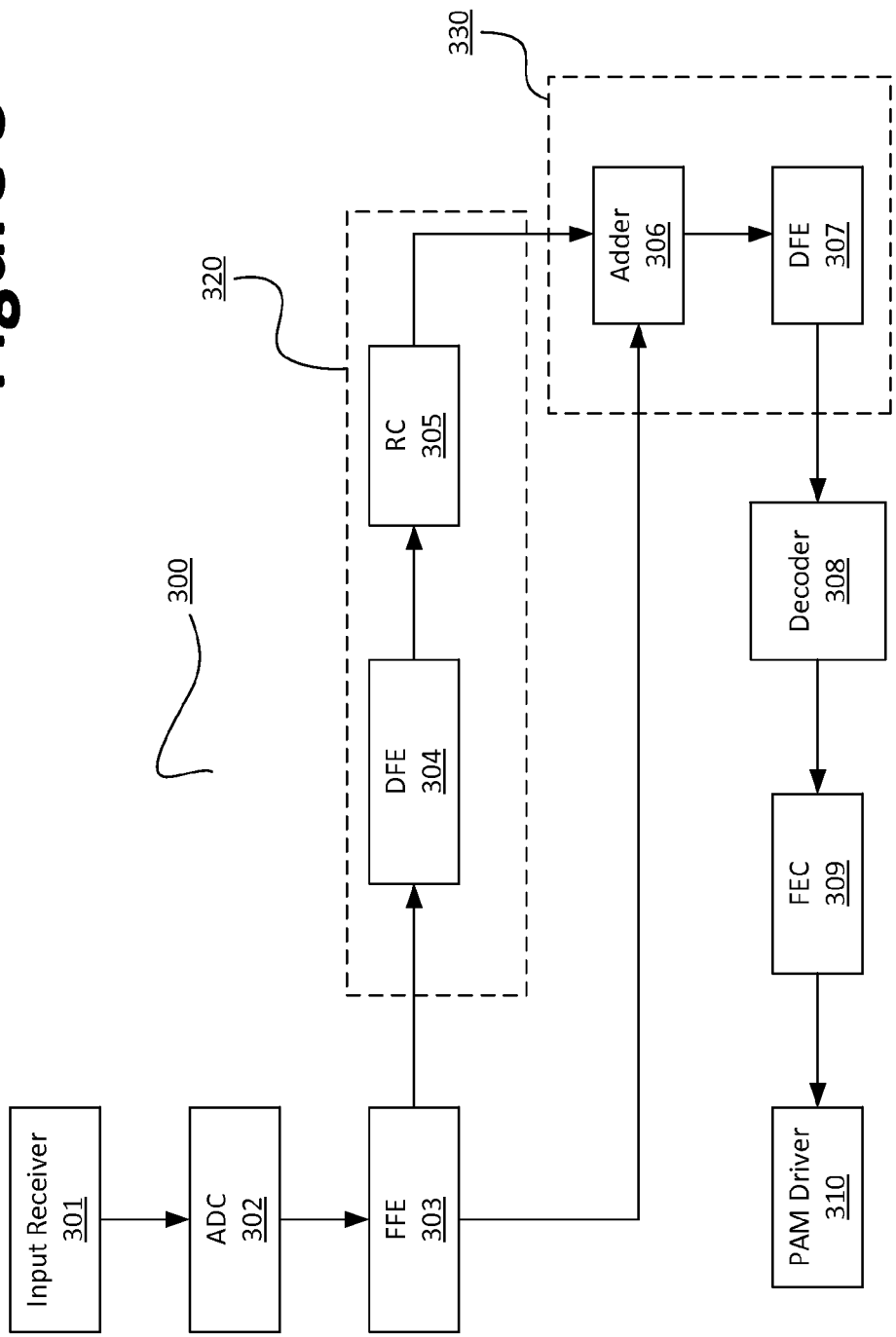
FIG. 3 is a simplified diagram illustrating a communication system 300 according to an embodiment of the present invention.

FIG. 3 is a simplified diagram illustrating a communication system 300 according to an embodiment of the present invention. This diagram is merely an example, which should not unduly limit the scope of the claims. One of ordinary skill in the art would recognize many variations, alternatives, and modifications. As an example, the communication system 300 is implemented as a part of a PAM-4 communication system, but it is to be understood that other implementations and applications are possible as well.

As shown in FIG. 3, an input receiver device 301 is configured for receiving an analog data stream. For example, the analog data stream comprises PAM data that is in an analog form for the purpose of transmission over the communication channel. The PAM data can be in PAM 4 format, PAM 2, PAM 8, or other types of PAM formats. According to an implementation, the input receiver device 301 comprises an optical communication interface, through which a large amount of data can be received at a high speed (e.g., 40 gigabits or higher). For example, the optical communication interface includes photo-detector, transimpedance amplifier (TIA), and other components for quickly processing a large amount of data.

The analog data stream is processed by an analog to digital converter (ADC) device 302 coupled to the input receiver device. Among other features, the ADC device 302 is configured to convert the analog data stream to a digital data stream at a relatively high speed. For example, the ADC device 302 can be implemented using SARs, flash ADC, and/or other types of ADC devices. The ADC device 302 is capable of processing data at a high speed, which is equal to or greater than the data transfer speed for receiving data at the input receiver device. The digital data stream comprises both signals and noises. According to various embodiments, the signals are encoded with PAM symbols (e.g., PAM 4 symbols). In addition to the symbols from which actual data can be extracted, the digital data stream also includes noises. As explained above, noises include both ISI noise signals and reflection signals. For example, the profile of reflection signals is illustrated in FIG. 2.

The digital data stream generated by the ADC device 302 is processed by the FFE device 303. For example, the FFE device 303 is a part of the DFE logic that removes ISI noises. Among other things, the FFE devices include one or more multipliers that are updated according to characteristics of the communication channel through which the data stream is received. The FFE device 303 is connected to a tentative data path 320 and a main data path 330. The tentative data path 320 includes the DFE device 304 and reflection cancellation (RC) circuit 305. For example, tentative data path 320 is specifically configured to remove reflection signals (e.g., ISI noise) from the digital data stream. The main data path 330, which includes the adder device 306 and the DFE 307, is configured to remove ISI noises after reflection signals is cancelled at the adder device 306.

As a part of the tentative data path 320, the DFE device 304 is configured to remove at least a portion of the ISI noises. For example, the DFE device 304 uses the outputs from the FFE device 303 to determine various characteristics of the communication channels, and using these characteristics, the DFE device 304 is able to remove ISI noises. Depending on the implementation, the DFE device 304 can move other types of noises as well.

As a part of the tentative data path 320, the main objective of the DFE device 304 and the RC circuit 305 is to remove the reflection signals. Since the DFE device 304 removes the ISI noises (or most of it) from the FFE 303 output, the RC circuit 305 is primarily configured to generating a correction signal. Depending on the implementation, the RC circuit 305 may also remove residual ISI noises from the output of the DFE device 304. The output of the RC circuit 305 is coupled to the adder 306. For example, the correction signal is based on the what is determined by the RC circuit 305 as the reflection signals, and a negative reflection signal added to the data stream (e.g., by the adder device 306) effectively removes the reflection signals.

Figure 4:
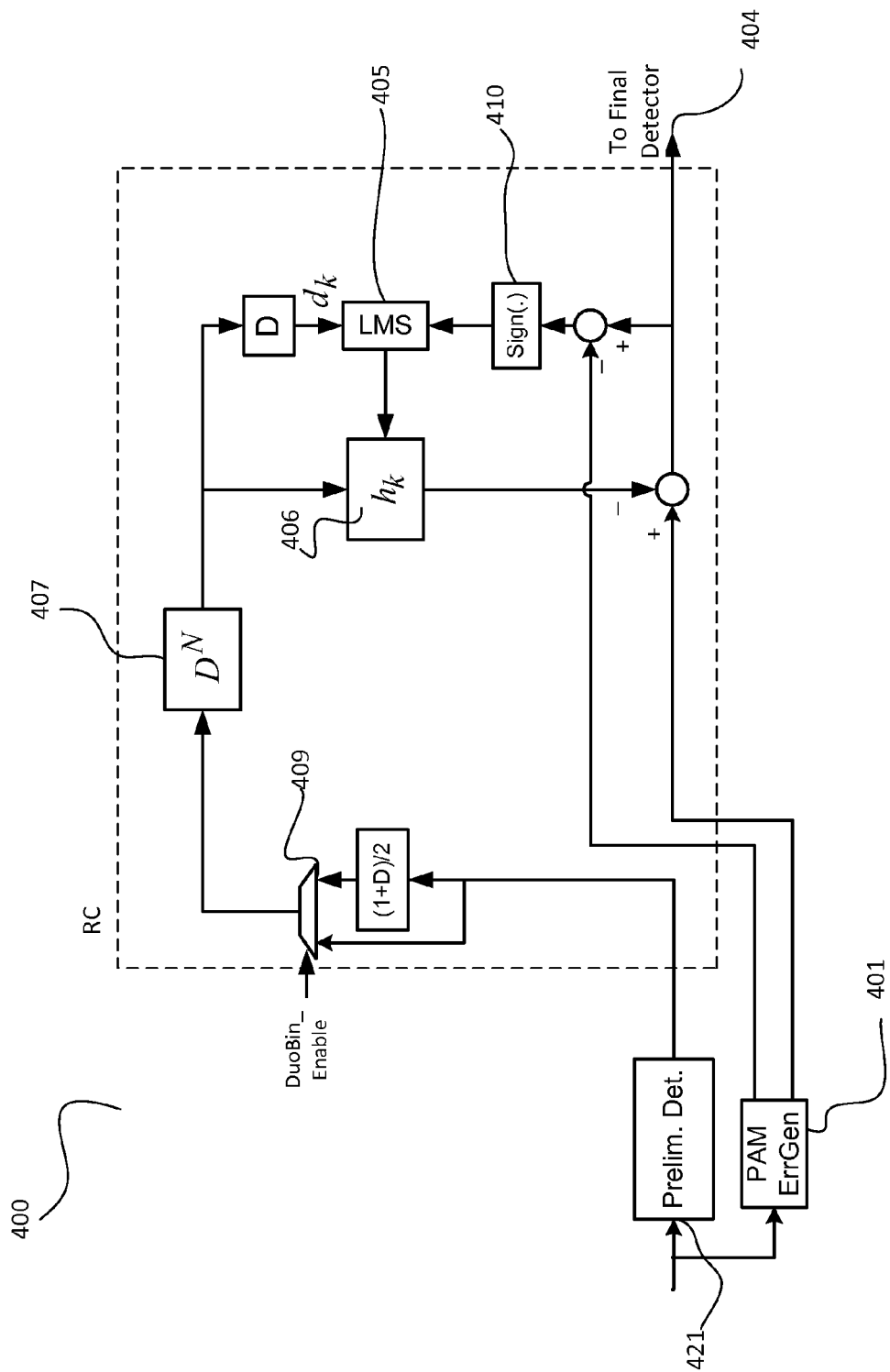
FIG. 4 is a simplified diagram illustrating an RC circuit 400 according to an embodiment of the present invention.

FIG. 4 is a simplified diagram illustrating an RC circuit 400 according to an embodiment of the present invention. This diagram is merely an example, which should not unduly limit the scope of the claims. One of ordinary skill in the art would recognize many variations, alternatives, and modifications. The RC circuit 400 includes input 421 and input 401. The input 421 provides a preliminary determination of reflection. In certain embodiments, the input 421 selects between an SLC input and a PAM DFE input. For example, the SLC input comprises a slicer for processing PAM signals. Depending on the implementation, the signal input into the RC circuit 400 can be processed by other types of signal processing modules in addition to the slicer and DEF. For example, the PAM 4 DFE corresponds to the DFE 304 in FIG. 3, which can be implemented using slicer (SLC) circuit instead. In various embodiments, both DFE and SLC circuits are used for reflection signal cancellation, and depending on the specific need, a selection is made between the DFE and the SLC circuits. The input 401 provides a reference signal. For example, the reference signal from the input 401 comprises an FFE signal output (e.g., from FFE 303 in FIG. 3) that is delay for three (or other number of) cycles.

The input 402 provides a signal to the duobinary squelcher 409. For example, the output of the input 420 comprises a tentative decision from the output of the SLC and/or DFE circuits. The duobinary squelcher 409 is specifically configured to remove Nyquist errors. For example, a DFE module, operating as a preliminary error detector, is often prone to Nyquist errors (e.g., oscillating between positive and negative values). As preliminary detectors, such as DFE for PAM4, often suffer from error propagation, it is to be appreciated that the addition of the duobinary squelcher 409 helps mitigate error propagation for preliminary DFE to final DFE. It is to be appreciated that other types of error removal techniques may be used in lieu or in combination of duobinary squelcher 409 to remove Nyquist errors.

The output of the duo binary squelcher 409 is processed by $D^N$ module 407, where N is selected from 2, 4, 8, and 16, which corresponds to PAM modulation. For example, N affects the amount of delay in removing reflection signals. If N is zero, the reflection cancellation is performed right away with no delay; when N is large, the reflection cancellation starts late. For example, if N is zero, reflection cancellation process starts during the time 203 to cancel reflection signals that are near the actual signal 201; if N is large, the reflection cancellation process is delayed (e.g., performed at time 204). It is to be appreciated that the N is selected based on the specific reflection noise characteristic. The least-mean-square (LMS) engine 405 is configured to set up one or more taps for error generation, which is based on the output of the module 407. The error generator device 406 uses the input from the module 407 and the LMS engine 405. According to a specific implementation, the error generator device 406 comprises a finite impulse response (FIR) filter. For example, one or more taps (e.g., 16 taps) may be needed for the FIR filter for generating an error signal, which is used for cancelling reflection signals. The output 404 of the RC circuit 400 is later provided to the DFE in the main signal line.

Now referring back to FIG. 3. The adder device 306 receives signals from both the FFE device 303 and the RC circuit 305. The data signals directly from the FFE device 303 going into the main path 330 include both ISI noises and reflection signals. With the correction signals from the RC circuit 305, the adder device 306 removes reflection signals from the data signals from the FFE device 303. The output data signals of the adder device 306 still include noises, but mostly ISI noises, as reflection signals have been removed using the correction signals.

The DFE device 307, as a part of the main signal path 330, removes the ISI noises from the data signals. It is to be appreciated that since most, if not all, of the reflection signals are removed using the correction signals, the DFE device 307 can better remove ISI and/or other noises, as reflection signals are no longer an issue and ISI noises are "isolated". For example, the coefficients of the FFE device 303 and the DFE device 307 are calculated mainly based on the channel characteristics that attribute to ISI noises, the reflection signals are essentially isolated from this calculation. In various implementations, the output of the DFE device 307 comprises PAM symbols (e.g., PAM 4 symbols) in digital form, which are based on output of the adder device 306 and the data stream. For example, the DFE device 307 comprises a PAM 4 slicer input, which includes four discrete levels. Each of the four discrete levels is separated from each other to minimize error rate among the four discrete levels.

The communication system 300 additionally includes a decoder device 308, which is configured for removing burst errors from the PAM symbols in digital form. For example, the decoder device is implemented using a 1+D Modulo-n Decoder. In a specific embodiment, the decode device 308 is a 1+D Modulo 4 Decoder. In certain implementations, the decoder device 308 is not used, as decoding may be performed by other components.

An FEC device 309 is coupled to the decoder device 308, which performs forward error correction on PAM symbols from the decoder device 308. As mentioned above, it is to be understood that the decoder device 308 is not used in certainly implementation, as the DFE 307 may perform decoding. For example, the PAM symbols from the decoder device 308 have been processed by the communication system 300 to have reflection signal, ISI noise, and burst errors removed through various components described above. The FEC device 309 is configured to provide forward error correction according to a predetermined coding algorithm, such as BCH code, RS code, and others.

The FEC device 309 is coupled to the PAM driver 310. For example, the PAM driver 310 comprises a PAM transmitter device for transmitting the processed signals.

Depending on the implementation, the communication system 300 may include other components as well. For example, the communication system 300 includes a PAM 4 receiver device, which can be characterized as a serializer/deserializer (SerDes) device. According to various embodiments, the PAM 4 transmitter device and the PAM 4 receiver device are integrated on a single integrated circuit device, which includes a plurality of CMOS device. For example, each of the CMOS devices has a design rule of 28 nm and less. In certain embodiments, each of the CMOS devices has a design rule of 16 nm and less using a FINFET process.

Figure 5:
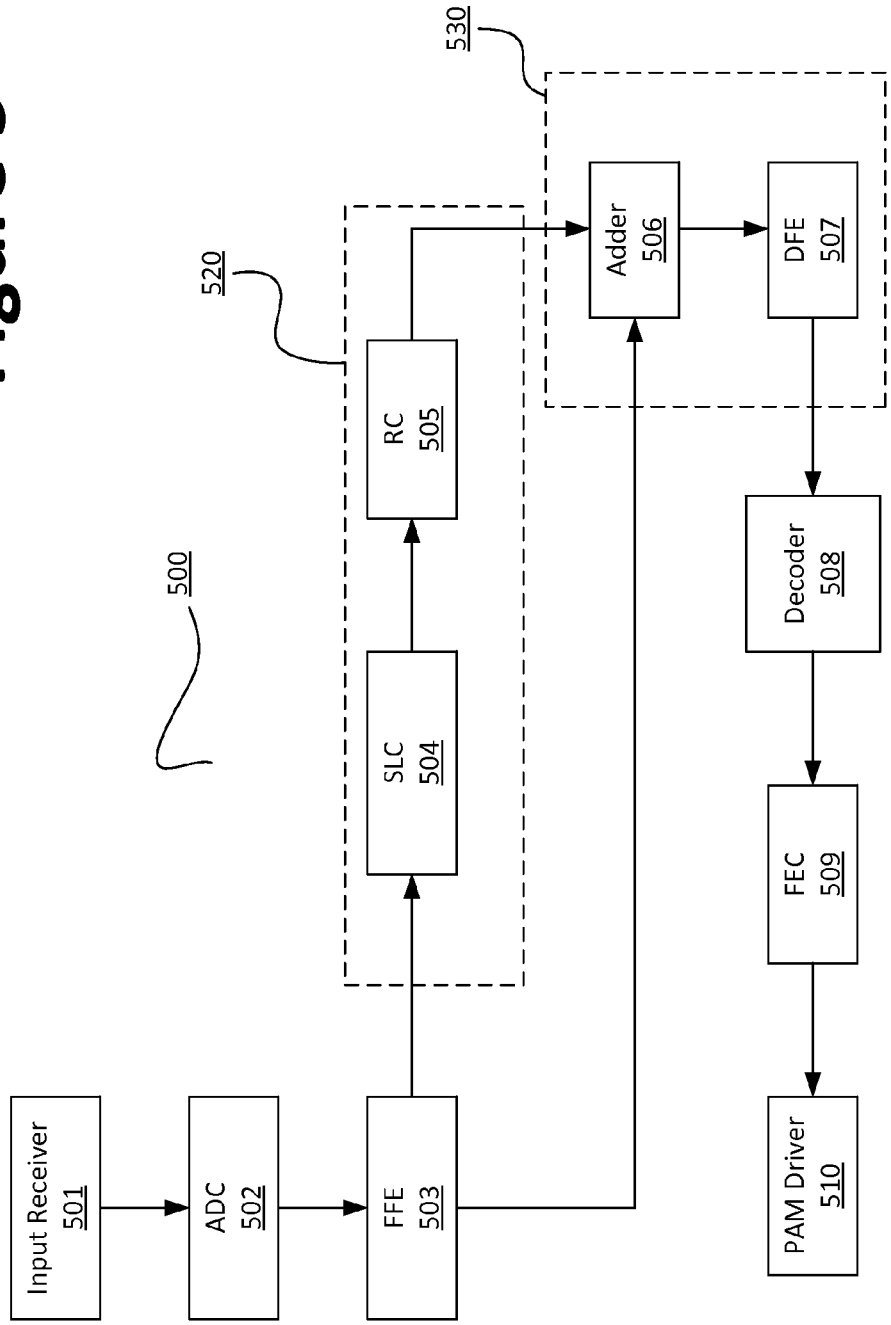
FIG. 5 is a simplified diagram illustrating a communication system 500 according to an embodiment of the present invention.

FIG. 5 is a simplified diagram illustrating a communication system 500 according to an embodiment of the present invention. This diagram is merely an example, which should not unduly limit the scope of the claims. One of ordinary skill in the art would recognize many variations, alternatives, and modifications. In FIG. 5, an input receiver device 501 is configured for receiving an analog data stream. For example, the analog data stream comprises PAM data that is in an analog form for the purpose of transmission over the communication channel. The PAM data can be in PAM 4 format, PAM 8, or other types of PAM formats. According to an implementation, the input receiver device 301 comprises an optical communication interface, through which a large amount of data can be received at a high speed (e.g., 40 gigabits or higher). For example, the optical communication interface includes photo-detector, transimpedance amplifier (TIA), and other components for quickly processing a large amount of data.

The analog data stream is processed by an analog to digital converter (ADC) device 502 coupled to the input receiver device. Among other features, the ADC device 502 is configured to convert the analog data stream to a digital data stream at a relatively high speed. For example, the ADC device 502 can be implemented using SARs, flash ADC, and/or other types of ADC devices. The ADC device 502 is capable of processing data at very high speed, which is equal to or greater than the data transfer speed for receiving data at the input receiver device. The digital data stream comprises both signals and noises. According to various embodiments, the signals are encoded with PAM symbols (e.g., PAM 4 symbols). In addition to the symbols from which actual data can be extracted, the digital data stream also includes noises. As explained above, noises include both ISI noise signals and reflection signal signals. For example, the profile of reflection signal signals is illustrated in FIG. 2.

The digital data stream generated by the ADC device 302 is processed by the FFE device 503. For example, the FFE device 503 is a part of the DFE logic that removes ISI noises. Among other things, the FFE device includes one or more multipliers that are updated according to characteristics of the communication channel through which the data stream is received. The FFE device 503 is connected to a tentative data path 520 and a main data path 530. The tentative data path 520 includes the SLC device 504 and reflection cancellation (RC) circuit 505. For example, tentative data path 520 is specifically configured to remove reflection signals from the digital data stream. The main data path 530, which includes the adder device 506 and the DFE 507, is configured to remove ISI noises after reflection signal is cancelled at the adder device 506.

As a part of the tentative data path 520, the SLC device 504 is configured to remove at least a portion of the ISI noises. As described above, the SLC device 504 may be implemented in conjunction with a DFE device, and the output of the SLC device 504 and the DFE device is selected by the RC circuit 305.

As a part of the tentative data path 520, the main objective of the SLC 504 and the RC circuit 505 is to remove the reflection signals. The RC circuit 505 is primarily configured to generating a correction signal. Depending on the implementation, the RC circuit 305 may also remove residual ISI noises from the output of the SLC device 504. The output of the RC circuit 505 is coupled to the adder 506. For example, the correction signal is based on what is determined by the RC circuit 505 as the reflection signal, and a negative reflection signal added to the data stream (e.g., by the adder device 506) effectively removes the reflection signal.

The adder device 506 receives signals from both the FFE device 503 and the RC circuit 505. The data signals directly from the FFE device 503 going into the main path 530 include both ISI noises and reflection signals. With the correction signals from the RC circuit 505, the adder device 506 removes reflection signals from the data signals from the FFE device 503. The output data signals of the adder device 506 still include noises, but mostly ISI noises, as reflection signals have been removed using the correction signals.

The DFE device 507, as a part of the main signal path 530, removes the ISI noises from the data signals. It is to be appreciated that since most, if not all, of the reflection signals are removed using the correction signals, the DFE device 307 can better remove ISI and/or other noises, as reflection signals are no longer an issue and ISI noises are "isolated". For example, the coefficients of the FFE device 503 and the DFE device 507 are calculated mainly based on the channel characteristics that attribute to ISI noises, the reflection signals are essentially isolated from this calculation. In various implementations, the output of the DFE device 507 comprises PAM symbols (e.g., PAM 4 symbols) in digital form, which are based on output of the adder device 306 and the data stream. For example, the DFE device 507 comprises a PAM 4 slicer input, which includes four discrete levels. Each of the four discrete levels is separated from each other to minimize error rate among the four discrete levels.

The communication system 500 additionally includes a decoder device 508, which is configured for removing burst errors from the PAM symbols in digital form. For example, the decoder device is implemented using a 1+D Modulo-n Decoder. In a specific embodiment, the decode device 308 is a 1+D Modulo 4 Decoder. In various implementations, the decoder device 508 is not used, as the DFE 507 may be used to perform decoding.

An FEC device 509 is coupled to the decoder device 508, which performs forward error correction on PAM symbols from the decoder device 508. For example, the PAM symbols from the decoder device 508 have been processed by the communication system 500 to have reflection signal, ISI noise, and burst errors removed through various components described above. The FEC device 509 is configured to provide forward error correction according to a predetermined coding algorithm, such as BCH code, RS code, and others.

The FEC device 509 is coupled to the PAM driver 510. For example, the PAM driver 510 comprises a PAM transmitter device for transmitting the processed signals.

Depending on the implementation, the communication system 500 may include other components as well. For example, the communication system 500 includes a PAM 4 receiver device, which can be characterized as a serializer/deserializer (SerDes) device. According to various embodiments, the PAM 4 transmitter device and the PAM 4 receiver device are integrated on a single integrated circuit device, which includes a plurality of CMOS device. For example, each of the CMOS devices has a design rule of 28 nm and less. In certain embodiments, each of the CMOS devices has a design rule of 16 nm and less using a FINFET process.

It is to be appreciated that embodiments of the present invention provides many advantages over existing solutions. Conventional DFEs usually use feed-forward (open-loop) equalization for the first few (and most important) taps, which often causes performance loss. In addition, at some implementations/speeds, the loop can be closed with extensive speculation, many are iteration-bound and unable to close the first few taps. Conventional DFEs are difficult to utilize in PAM-4 (or higher order PAM) based communication systems. For example, conventional PAM-4 DFEs implemented in parallel suffer a 4N exponential state increase, and conventional successive approximation PAM-4 DFEs typically have increasing analog content to carry more approximations forward. In comparison, embodiments of the present invention provide reflection signal cancellation that is used in conjunction with DFEs, which offer both the performance and ease of implementation. In addition, embodiments of the present invention can be used with existing communication systems. There are other embodiments as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication system, the system comprising:
   an input receiver device for receiving an analog data stream;
   an analog to digital converter (ADC) device coupled to the input receiver device, the ADC device being configured to convert the analog data stream to a digital data stream, the digital data stream comprising a first signal and a first noise profile associated with the first signal, the first noise profile including inter-symbol interference (ISI) noise signals and reflection signals;
   a feed forward equalizer (FFE) device coupled to the ADC device and configured to be connected/coupled to a tentative signal path and a main signal path;
   a first decision feedback equalizer (DFE) device configured to be connected/coupled to an output of the feed forward equalizer device through the tentative signal path, the first DFE being configured to remove at least a first portion of the ISI noise signals;
   an adder device configured to connect the tentative signal path and the main signal path;
   a reflection canceller circuit coupled to the first DFE device and configured to be connected/coupled to the main signal path through the adder device, the reflection canceller circuit being configured to input a plurality of correction signals, the correction signals being configured to cancel a second portion of the ISI noise signal and reflection signal signals traversing through the main signal path;
   the adder device configured to output an intermediary signal; and
   a second DFE device coupled to an output of the adder device and configured to output a PAM 4 symbol in digital form in response to receiving the intermediary signal.

2. The system of claim 1 wherein the first DFE device comprises a PAM-4 one-tap DFE device.

3. The system of claim 1 further comprising a forward error correcting decoder device coupled to the 1+D Modulo 4 Decoder.

4. The system of claim 1 wherein the reflection canceller circuit comprises:
   a reflection canceller filter device;
   an error generation device, and
   a least means square engine.

5. The system of claim 1 wherein the reflection canceller circuit comprises:
   a reflection canceller filter device;
   an error generation device; and
   a least means square engine;
   wherein the reflection canceller filter device is configured to remove an interference using a tentative decision from an output of the first DFE after passing through a duo binary squelcher device coupled to the reflection canceller filter device.

6. The system of claim 1 wherein the reflection canceller circuit comprises:
   a reflection canceller filter device;
   an error generation device; and
   a least means square engine;
   wherein:
      the reflection canceller filter device is configured to remove an interference using a tentative decision from an output of the first DFE after passing through a duo binary squelcher device coupled to the reflection canceller filter device,
      the least means square engine is configured to set a tap of the reflection canceller filter device.

7. The system of claim 1 wherein the reflection canceller circuit comprises:
   a reflection canceller filter device;
   an error generation device; and
   a least means square engine;
   wherein:
      the reflection canceller filter device is configured to remove an interference using a tentative decision from an output of first DFE device after passing through a duo binary squelcher device coupled to the reflection canceller filter device,
      the least means square engine is configured to set a tap of the reflection canceller filter device,
      the error generator device configured to take an output of the feed forward equalizer device and compares the output of the FFE device to the output of the first DFE device to generate an error signal for the least means square engine to adapt the tap of the reflection canceller filter device.

8. The system of claim 1 wherein the second DFE device comprises a PAM 4 slicer input, the slicer input comprising four discrete levels, each of the four discrete levels being separated from each other to minimize error rate between the levels.

9. The system of claim 1 wherein the PAM 4 symbol is included in a PAM 4 receiver device.

10. The system of claim 9 wherein the PAM 4 receiver device is characterized as a SERDES device.

11. The system of claim 9 further comprising a PAM 4 transmitter device.

12. The system of claim 11 wherein the PAM 4 transmitter device and the PAM 4 receiver device are integrated on a single integrated circuit device, the single integrated circuit device comprising a plurality of CMOS device, each of the CMOS devices having a design rule of 28 nm and less.

13. The system of claim 12 wherein the PAM 4 transmitter device and the PAM 4 receiver device are integrated on a single integrated circuit device, the single integrated circuit device comprising a plurality of CMOS device, each of the CMOS devices having a design rule of 16 nm and less using a FINFET process.

14. A communication system, the system comprising:
an input receiver device for receiving an analog data stream;
an analog to digital converter (ADC) device coupled to the input receiver device, the ADC device being configured to convert the analog data stream to a digital data stream, the digital data stream comprising a first signal and a first noise profile associated with the first signal, the first noise profile including inter-symbol interference (ISI) noise signals and reflection signals;
a feed forward equalizer (FFE) device coupled to the ADC device and configured to be connected/coupled to a tentative signal path and a main signal path;
a first decision feedback equalizer (DFE) device configured to be connected/coupled to an output of the feed forward equalizer device through the tentative signal path, the first DFE being configured to remove at least a first portion of the ISI noise signals;
an adder device configured to connect the tentative signal path and the main signal path;
a reflection canceller circuit coupled to the first DFE device and configured to be connected/coupled to the main signal path through the adder device, the reflection canceller circuit being configured to input a plurality of correction signals, the correction signals being configured to cancel a second portion of the ISI noise signal and reflection signals traversing through the main signal path;
the adder device configured to output an intermediary signal;
a second DFE device coupled to an output of the adder device and configured to output a PAM 4 symbol in digital form, in response to receiving the intermediary signal; and
a forward error correcting decoder device.

15. The system of claim 14 wherein the reflection canceller circuit comprising a reflection canceller filter device, an error generation device, and a least means square engine.

16. The system of claim 14 the reflection canceller circuit comprises:
a reflection canceller filter device;
an error generation device; and
a least means square engine;
wherein the reflection canceller filter device is configured to remove an interference using a tentative decision from an output of the first DFE after passing through a duo binary squelcher device coupled to the reflection canceller filter device.

17. The system of claim 14 wherein the reflection canceller circuit comprises:
a reflection canceller filter device comprising a finite impulse response filter;
an error generation device; and
a least means square engine.

18. A communication system, the system comprising:
an input receiver device for receiving an analog data stream;
an analog to digital converter (ADC) device coupled to the input receiver device, the ADC device being configured to convert the analog data stream to a digital data stream, the digital data stream comprising a first signal and a first noise profile associated with the first signal, the first noise profile including inter-symbol interference (ISI) noise signals and reflection signals;
a feed forward equalizer (FFE) device coupled to the ADC device and configured to be connected/coupled to a tentative signal path and a main signal path;
a slicer device configured to be connected/coupled to an output of the feed forward equalizer device through the tentative signal path, the slicer device being configured to remove at least a first portion of the ISI noise signals;
an adder device configured to connect the tentative signal path and the main signal path;
a reflection canceller circuit coupled to the slicer device and configured to be connected/coupled to the main signal path through the adder device, the reflection canceller circuit being configured to input a plurality of correction signals, the correction signals being configured to cancel a second portion of the ISI noise signal and the reflection signals traversing through the main signal path;
the adder device configured to output an intermediary signal; and
a DFE device coupled to an output of the adder device configured to output a PAM 4 symbol in digital form in response to receiving the intermediary signal.

19. The system of claim 18 wherein the reflection canceller circuit comprises a finite impulse response filter for removing the reflection signals.

* * * * *